United States Patent [19]

Logsdon

[11] Patent Number: 4,930,733

[45] Date of Patent: Jun. 5, 1990

[54] PIPE HOLDERS

[75] Inventor: Duane D. Logsdon, Fullerton, Calif.

[73] Assignee: Logsdon Foundation, Stanton, Calif.

[21] Appl. No.: 340,214

[22] Filed: Apr. 19, 1989

Related U.S. Application Data

[63] Continuation-in-part of Ser. No. 290,985, Dec. 28, 1988, Pat. No. 4,903,921.

[51] Int. Cl.$^5$ ................................................ F16L 5/00
[52] U.S. Cl. ...................................... 248/56; 248/74.2
[58] Field of Search .................... 248/74.5, 56, 74.1, 248/74.2, 74.3, 27.3; 24/530, 531, 532, 534, 543, 339; 174/153 G; 16/2

[56] References Cited

U.S. PATENT DOCUMENTS

| | | | |
|---|---|---|---|
| 3,272,461 | 9/1966 | Larkin | 248/56 |
| 3,562,847 | 2/1971 | Jemison | 248/56 |
| 3,684,220 | 8/1972 | Logsdon | 248/56 |
| 3,684,223 | 8/1972 | Logsdon | 248/74.3 |
| 3,889,909 | 6/1975 | Koscik | 174/153 G X |
| 4,407,042 | 10/1983 | Schramme | 16/2 |
| 4,442,994 | 4/1984 | Logsdon | 248/74.3 |
| 4,448,376 | 5/1984 | Behrendt | 248/27.3 |
| 4,467,988 | 8/1984 | Kraus | 248/74.1 |
| 4,474,489 | 10/1984 | Simon | 174/153 G X |

FOREIGN PATENT DOCUMENTS 3029975 3/1982 Fed. Rep. of Germany ..... 248/74.2
2092216 8/1982 United Kingdom .............. 248/74.2

*Primary Examiner*—J. Franklin Foss

[57] ABSTRACT

A known pipe holder having a split cylindrical body having a plurality of spaced pipe engaging fins located on the interior therof, a plurality of holding structures for engaging the interior of a hole in a support member located on the exterior thereof and flanges for limiting the insertion of said body into such a hole by engaging a surface in the support member, said body being capable of being temporarily opened along the slit therein so that it can be around a pipe can be improved by (1) constructing the holding structures so that each of them comprises a plurality of spaced, radially extending elongated vanes for engaging the interior of an elongated hole, each of the vanes having an edge located remote from the body, each of the vanes also having a barb located on each of the edges; or (2) constructing the holding structures so that each of them comprises a plurality of spaced ratchets located on the exterior of the body at the same distance from the flanges for engaging the surface of a member remote from a surface of the member engaged by said flanges; of both (1) and (2). In addition the interior of the body preferably includes resilient, flexible fins for holding a pipe.

7 Claims, 1 Drawing Sheet

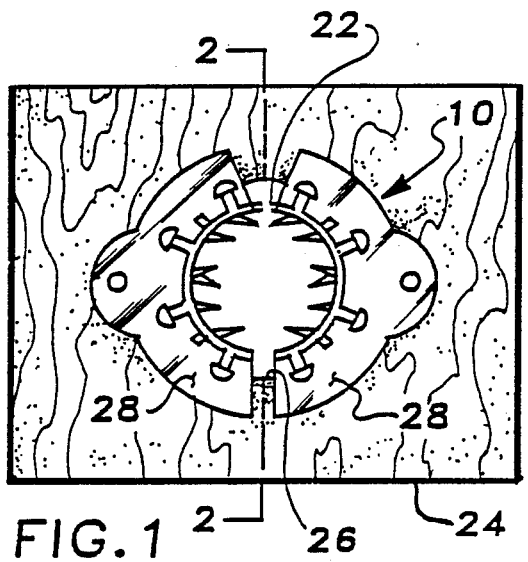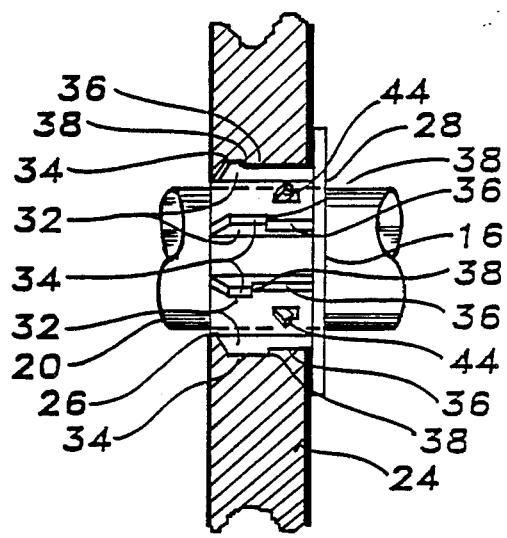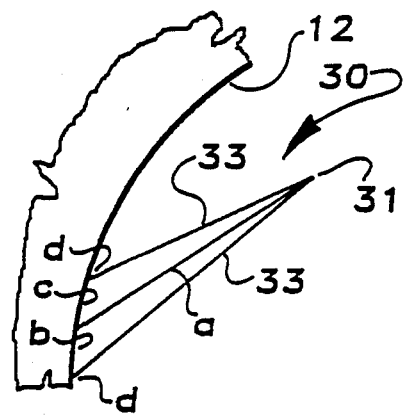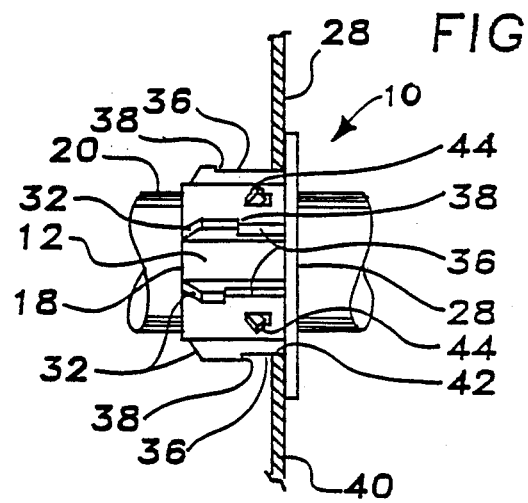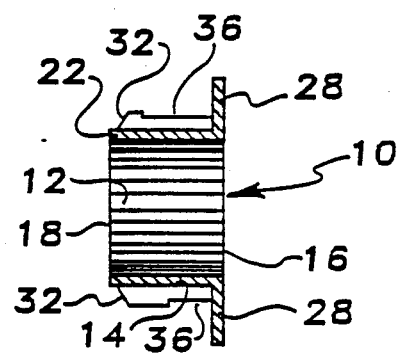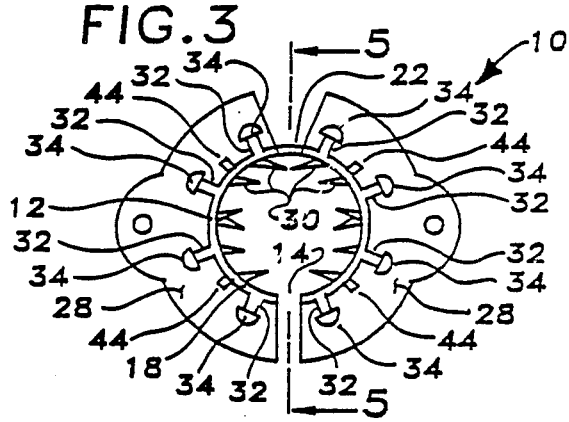

PIPE HOLDERS

CROSS-REFERENCE TO RELATED APPLICATION

This specification discloses some subject matter common to that disclosed and claimed in the copending Duane D. Logsdon application titled "Pipe Holders" filed Dec. 28, 1989, Ser. No. 7/290,985 and is, therefore, a continuation-in-part of said application Ser. No. 7/290,985 now patent No. 4,903,921. The entire disclosure of said application Ser. No. 7/290,985 is incorporated herein by reference.

BACKGROUND OF THE INVENTION

As indicated by the title this invention relates to new and improved pipe holders. More specifically it pertains to pipe holders which are improved over those pipe holders set forth in the U.S. Pat. No. 3,684,220 issued Aug. 15, 1972 entitled "Pipe Holder."

From a consideration of this prior U.S. Pat. No. 3,648,220 it will be apparent that it primarily pertains to pipe holders which are adapted to be inserted in a hole in a structural member such as a common wood stud and which are adapted to hold a pipe passing through such a hole so as to tend to isolate the pipe from the stud or other related member while concurrently supporting the pipe. Such holders are "reasonably" effective in reducing the transmission of sound and heat to a structural member or stud and, when the pipe and the structural member are of different metals, in tending to avoid galvanic corrosion. The pipe holders described in this prior patent can be easily and conveniently manufactured at a comparatively nominal cost and may be easily installed in a member such as a stud.

Although these factors would indicate that there is substantially no need for new and improved pipe holders in fact there is such a need. One reason why such a need exists relates to the fact that prior pipe holders as shown in the noted patent normally have to be secured to a stud or similar structural member using a fastener such as a common nail so as to avoid any possibility of such pipe holders being displaced from the holes within which they are initially located. While the use of such a fastener is not difficult or particularly expensive the use of such fasteners is considered undesirable. This is because there is a cost involved in the use of such a fastener. At current labor rates even such small costs can be quite undesirable. In addition on occasion due to error such fasteners may not be used in a particular location.

Although the possibility of the displacement of a pipe holder occurring as a result of the omission of a fastener is relatively remote it is considered that such movement or displacement can occur as a result of various factors such as adherence of the pipe holder to a pipe as the pipe expands and contracts and such motion gradually resulting in a pipe holder "working" out of the hole within which it is initially located. A pipe holder can also be moved from a hole in which it is located when no fastener is used in other manner. It is self evident that if a pipe holder used to support a pipe in a hole is displaced from a hole that there is a significant possibility of the pipe sagging or otherwise distorting so as to be in direct contact with the interior of the hole. Whenever this occurs the consequences such as occur when no pipe holder is used are to be anticipated.

BRIEF SUMMARY OF THE INVENTION

As the result of the fact that prior pipe holders as set forth in the U.S. Pat. No. 3,684,220 are not as desirable as one might like because of the fact that they should be used with a fastener such as a nail in order to make sure that they are displaced from intended locations it is believed apparent that there is a need for new and improved pipe holders which are closely related to those pipe holders set forth in the U.S. Pat. No. 3,684,220. The present invention is intended to fulfill this need.

The invention is intended to provide pipe holders as indicated which are of such a character that they may be adequately or reasonably secured without the use of a separate fastener to the interior of a hole having a significant depth such as a hole through a common wood stud so that it will not normally come out of such a hole. The invention is also intended to provide pipe holders as indicated which are of such a character that they may be adequately or reasonably secured without the use of a separate fastener with a hole in a comparatively thin member such as a stud formed of sheet steel or the like. Preferably a pipe holder of the invention is constructed so that it is capable of being held in both of such types of holes so that it can be used in a variety of different applications.

An objective of the invention is also to provide pipe holders of a category as indicated in the preceding discussion which are of such a character that they may be easily and conveniently installed in virtually any desired location with a minimum of difficulty. The invention is also intended to provide pipe holders which are of such a character that there is no reasonable chance of their damaging even comparatively thin walled pipe or tubing as the result of fins within the holders resiliently engaging and supporting such pipe or tubing. Further, the invention is considered to achieve all of the desirable results set forth the copending application noted in the preceding in pipe holders which can be produced at about the same cost as prior related pipe holders.

In accordance with this invention these various objectives are achieved by providing a pipe holder having a split cylindrical body having a plurality of spaced pipe engaging fins located on the interior thereof, a plurality of holding means for engaging the interior of a hole in a support member located on the exterior thereof and flange means for limiting the insertion of said body into such a hole by engaging a surface in the support member, said body being capable of being temporarily opened along the slit therein so that it can be around a pipe in which the improvement comprises either:

(1) each of the holding means comprising a plurality of spaced, radially extending elongated vanes for engaging the interior of an elongated hole, each of the vanes having an edge located remote from the body, each of said vanes also having a barb means located on each of said edges; or (2) each of the holding means comprising a plurality of spaced ratchet means located on the exterior of the body at the same distance from the flange means for engaging the surface of a member remote from a surface of the member engaged by said flange means; of both (1) and (2). In addition the interior of the body preferably includes resilient, flexible fins as hereinafter discussed for holding a pipe.

BRIEF DESCRIPTION OF THE DRAWING

Because of the nature of this invention it is best more fully explained with reference to the accompanying drawing in which:

FIG. 1 is an elevational view of the front end of a presently preferred embodiment or form of a pipe holder of the invention as installed in a hole in a wood support member such as a common stud;

FIG. 2 is a view taken at line 2—2 in FIG. 1 in which the pipe holder is shown in elevation and the support member is shown in section;

FIG. 3 is a view corresponding to FIG. 2 but showing the pipe holder as installed in a hole in a comparatively thin sheet steel support member such as a sheet steel stud;

FIG. 4 is a elevational view showing the rear end of the pipe holder;

FIG. 5 is a cross-sectional view taken at line 5—5 of FIG. 4; and

FIG. 6 is an enlarged, diagrammatic view showing the configuration of one of the fins in the holder illustrated as this fin appears in FIG. 1.

The pipe holder illustrated in the drawing is constructed so as to embody the essentially intangible concepts or principles of the invention set forth and defined in the appended claims. From a consideration of this specification and the accompanying drawing those familiar with the design and construction of pipe holders will realize that these concepts or principles can be embodied with other pipe holders than the one illustrated and described as to engineering details of a routine nature without departing from the subject matter defined in the appended claims.

DETAILED DESCRIPTION OF THE PREFERRED EMBODIMENT

In the drawing there is shown a pipe holder 10 which is preferably formed as an integral structure out of a somewhat resilient, self supporting, electrically non-conductive, relatively inert, relatively resistant to creep polymer such as a grade of common polypropylene as is frequently used for bottle closures and other related items. Of course other different polymers having physical properties which are similar to the physical properties of this specific polymer can be used to form the holder 10. Normally the holder 10 will be formed of such a material by established injection molding techniques. It is important to note that the holder 10 is shaped so as to be capable of being manufactured using "straight pull" dies. This achieves a degree of economy of manufacture since such dies are normally less expensive than dies including cores, slides and the like and normally can be run at a comparatively rapid machine cycle.

The pipe holder 10 has a generally cylindrical body 12 shaped so as to have an elongated slit 14 extending between its front end 16 and its rear end 18. This body 12 is preferably sufficiently thin so as to be flexible enough to be capable of being temporary distended or opened along its length so as to be slipped around a pipe or tube 20 as shown in phantom in FIGS. 2 and 3. If desired a strip 22 which is sufficiently thin so as to act as a hinge can be provided on the body 12 diametrically opposite to the slit 14. When such a strip 20 is used the pipe holder 10 can be easily opened and closed around a pipe 20 as it is being installed in an operative location.

During such installation the holder 10 is opened and placed around a pipe 20 and then closed or allowed to close automatically in a location somewhat remote from any support such as a stud 24 as illustrated in FIGS. 1 and 2. After being so located this holder 10 is pushed along the pipe 20 into a cylindrical hole 26 in the stud 24 until such time as radially extending flanges 28 on the body 12 engage the stud 24 so as to limit further insertion of the holder 10. These flanges 28 thus serve as means limiting insertion of the holder 10 into a hole. Two of these flanges 28, each located between the slit 14 and the strip 22 are used so as to avoid the reinforcing action of a continuous flange which would tend to impede the holder 10 being opened.

When the holder 10 is so installed small fins or ridges 30 on the interior of the body 12 engage the pipe 20 so as to resiliently mount it in place. These fins 30 are preferably constructed as set forth in the copending U.S. application Ser. No. 7/290,985 and are located so as to all be parallel to the axis (not illustrated) of the body 12 along the entire length of this body 12. Because these fins 30 are described in detail in this copending application it is not considered necessary to describe them in detail in this specification.

They are flexible, somewhat elongated fins 30 having pointed ends 31 which are located so as not to be pointed directly toward the center of the body 12 when this body 12 is in its normal closed configuration. As a result of this they resiliently support the pipe 20 in such a manner as to avoid tending to damage it and in such a manner as to accommodate heat caused expansion of the pipe 20. Concurrently these ridges accomplish the other functions of the related, but different fins or ridges set forth in the U.S. Pat. No. 3,684,220.

Preferably the fins 30 are of a triangular shape and the pointed ends 31 are defined by sides 33 which are located at an angle of about 30 to about 60 degrees to one another. Each of these fins 30 is preferably long enough so that the length of a line a connecting its end 31 and the mid point b of another line c extending between the corners d where the fin 30 extends from the body 12 is at least 150% of the length of this line c extending between the corners. Further, preferably the fins 30 are sufficiently small so as to be capable of flexing when in contact with the pipe 20.

The holder 10 also includes two different types of holding means for use in supporting this holder 10 on an appropriate support member. The first of these holding means comprises a series or plurality of radially extending vanes 32 located equidistant from one another so as to extend outwardly from the body 12. These vanes 32 are all of a flat, plate like shape. They are all sufficiently stiff so as to be capable of holding the body 12 in such a manner that it is spaced equidistant from the interior of the hole 26 in the stud 24 when the holder is installed as previously described. These vanes 32 all serve the same function as the corresponding parts described in the U.S. Pat. No. 3,684,220. In addition, however, they serve another function—a holding function. This is related to the construction of these vanes 32.

The edge 34 of each of the vanes 32 remote from the body 12 is generally parallel to this body 12 and these edges 34 are located equidistant from the body 12. This is so that the vanes 32 will normally serve to locate the pipe 20 in the middle of the hole 26. In accordance with this invention these vanes are provided with edge notches 36 facing back generally toward the flanges 28. These notches 36 have comparatively sharp, almost pointed ends 38 serving as barbs or barb means so as to prevent the holder from being easily backed out of or removed from a hole 26 one it has been installed as previously indicated. The ends 38 serve this function because they are sufficiently sharp so as to tend to "bite into" wood to achieve a holding action.

While these ends 38 serve this function it is important to note that the holding action is not "absolute" in the sense that it cannot be reversed. It is considered important for the ends to engage the interior of a hole 26 firmly, but not so firmly that the holder 10 cannot be removed from a hole 26 if, for any reason, it should be necessary to remove it. As a result of these considerations it is believed that the dimensions of the vane 32 should be related to the diameter of a hole 26 so as to achieve a press fit within this hole 26. Further, it is considered that the distances of the notches 36 (and, hence, the ends 38) from the flanges 28 should be staggered as illustrated in case the hole 26 might turn out to be of a non-uniform diameter or should have an internal enlargement which would preclude ends 38 from adequately functioning.

So that it can be used with sheet metal studs 40 or the like having a hole 42 which does not have any significant depth a series of resilient ratchet levels 44 are preferably located on the body 12 so as to extend outwardly from this body 12. These levers 44 are spaced equidistant from one another around the body 12 and are located with respect ro the flanges 28 the same distance such that their ends 46 are spaced from the flanges a distance which corresponds to the depth of the hole 42. With this construction the holder 10 may be installed on the stud 40 by first being installed on a pipe 20 as described and by then being inserted in the hole 42 so as to give the levers 44 to snap outwardly to engage the studs 40 as shown in FIG. 3. The flanges 28 will prevent any further insertion.

I claim:

1. A pipe holder having a split cylindrical body having a plurality of spaced pipe engaging fins located on the interior thereof, a plurality of holding means for engaging the interior of a hole in a support member located on the exterior thereof, and flange means for limiting the insertion of said body into such a hole by engaging a surface in the support member, said body being capable of being temporarily opened along the slit therein so that it can be fitted around a pipe, in which the improvement comprises:
   said holding means comprising a plurality of spaced, radially extending elongated vanes for engaging the interior of an elongated hole, each of the vanes having an edge located remote from the body, each of said vanes also having a barb means located on each of said edges;
   a plurality of spaced, resilient, flexible fins for holding a pipe located in the interior of said body, said fins extending along the length of said body parallel to the axis of said body, said fins being located so as not to be pointed directly toward the center of said body when said body is in a closed configuration so as to resiliently support a pipe held by said pipe holder so as to avoid the ends of said fins tending to contact the pipe so as to damage it and so as to accommodate heat-caused expansion of said pipe;
   each of said fins having a triangular shape and having sides which are located at an angle of from about 30 degrees to about 60 degrees to one another and being long enough so that the length of a line connecting its end with the midpoint of another line extending between its corners along said body is at least 150% of the length of said other line.

2. A pipe holder as claimed in claim 1 wherein:
   the spacing of said barb means on said vanes from said flange means is staggered.

3. A pipe holder as claimed in claim 2 wherein:
   said barb means are edge notches having pointed ends facing said flange means.

4. A pipe holder as claimed in claim 1 wherein:
   said holding means comprising a plurality of spaced ratchet means located on the exterior of the body at the same distance from the flange means for engaging the surface of a member remote from a surface of the member engaged by said flange means.

5. A pipe holder as claimed in claim 4 wherein:
   the spacing of said barb means on said vanes from said flange means is staggered; and
   said barb means are edge notches having pointed ends facing said flange means.

6. A pipe holder having a split cylindrical body having a plurality of spaced pipe engaging fins located on the interior thereof, a plurality of holding means for engaging the interior of a hole in a support member located on the exterior thereof, and flange means for limiting the insertion of said body into such a hole by engaging a surface in the support member, said body being capable of being temporarily opened along the slit therein so that it can be fitted around a pipe in which the improvement comprises:
   said holding means comprising a plurality of spaced ratchet means located on the exterior of the body at the same distance from the flange means for engaging the surface of a member remote from a surface of the member engaged by said flange means;
   a plurality of spaced, resilient, flexible fins for holding a pipe located on the interior of said body;
   said fins extending along the length of said body parallel to the axis of said body, said fins being located so as not to be pointed directly toward the center of said body when said body is in a closed configuration so as to resiliently support a pipe held by said pipe holder so as to avoid the ends of said fins tending to contact the pipe so as to damage it and so as to accommodate heat-caused expansion of said pipe;
   each of said fins having a triangular shape and having sides which are located at an angle of from about 30 degrees to about 60 degrees to one another and being long enough so that the length of a line connecting its end with the midpoint of another line extending between its corners along said body is at least 150% of the length of said other line.

7. A pipe holder as claimed in claim 6 wherein each of said ratchet means is a resilient ratchet lever located on said body so as to extend outwardly from said body, said ratchet levers being located equidistant from one another around the periphery of said body.

* * * * *